(12) United States Patent
Anderson

(10) Patent No.: US 6,173,846 B1
(45) Date of Patent: *Jan. 16, 2001

(54) SAFETY STOP FOR PALLET RACK

(76) Inventor: Michael R. Anderson, P.O. Box 923, Billings, MT (US) 59103-0923

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/013,394

(22) Filed: Jan. 26, 1998

(51) Int. Cl.[7] .................................................. A47F 5/00
(52) U.S. Cl. ............................ 211/183; 211/191; 248/235
(58) Field of Search .................................. 211/183, 189, 211/191, 192, 151; 248/346.02, 224.8, 315, 235, 346.03, 300

(56) References Cited

U.S. PATENT DOCUMENTS

| | | | |
|---|---|---|---|
| 1,703,872 | * 3/1929 | Engelson | 248/224.8 |
| 1,938,370 | * 12/1933 | Bodkin | 248/224.8 |
| 2,080,261 | * 5/1937 | Funk | 248/224.8 |
| 2,761,640 | * 9/1956 | Frater | 248/224.8 |
| 2,933,196 | * 4/1960 | Childs | 211/183 |
| 3,015,400 | * 1/1962 | Foster | 211/183 |
| 3,802,574 | * 4/1974 | Weider | 211/191 |
| 4,053,246 | * 10/1977 | Uccello | 211/183 |
| 4,310,193 | * 1/1982 | Kolleas | 248/224.8 |
| 4,383,614 | * 5/1983 | Miller | 211/183 |
| 4,450,775 | * 5/1984 | Brendle | 211/191 |
| 4,729,484 | * 3/1988 | McConnell | 211/183 |
| 4,874,148 | * 10/1989 | Guinter | 248/224.8 |
| 5,573,125 | 11/1996 | Denny | 211/183 |
| 5,601,198 | 2/1997 | Reed | 211/183 |
| 5,678,797 | * 10/1997 | Gogan | 211/183 |
| 5,791,498 | * 8/1998 | Mills | 211/183 |

* cited by examiner

Primary Examiner—Daniel P. Stodola
Assistant Examiner—Jennifer E. Novosad
(74) Attorney, Agent, or Firm—Jenkens & Gilchrist, P.C.

(57) ABSTRACT

A safety bracket attached to the load beams of a pallet rack for preventing pallets from being pushed off the rear end of the rack. The bracket has a base, a back extending upwardly to form a stop for the pallet, and a front having an aperture to allow insertion of a load beam through the aperture of the bracket. The base of the bracket rests on a load beam of the rack.

7 Claims, 3 Drawing Sheets

SAFETY STOP FOR PALLET RACK

FIELD OF THE INVENTION

This invention generally relates to safety devices which are installed onto pallet racks and the like. More particularly, this invention relates to an improved pallet rack having a safety bracket that is easily and quickly attached to the pallet rack and which is used as a safety barrier to prevent pallets from being pushed off the pallet rack.

Pallet racks provide a primary storage support structure in large warehousing, storage and distribution facilities. In such warehousing operations, fork lifts or other vehicles are commonly employed to load or remove loaded pallets from the pallet racks. Large retailing operations have also recently employed pallet racks to both store and display products in the retail showroom. As the size of the facilities has increased and the direct access of the public to pallet racks systems has increased, the damage potential due to accidental droppage or improper loading of the pallet racks has also escalated.

Safety systems have been installed to enhance the safety and minimize safety risks from mishandling or misloading of the pallet racks. For instance, U.S. Pat. Nos. 5,573,125, 5,170,829, and 4,981,225 describe the use of retractable safety net systems mounted on pallet racks to prevent accidental droppage. U.S. Pat. No. 5,601,198 describes the use of an apparatus for selectively holding, retaining, supporting, and/or securing objects upon one or more shelves, and prevent such objects from inadvertently falling therefrom. The apparatus generally comprises a flexible, elastic barrier, or barrier having an elastic membrane therein, that permits observation and inspection of objects contained within an interior compartment or enclosure on the shelf. The barrier can be stretched and pulled aside to allow access to the compartment or enclosure and when released, retracts back to an original position to function as a barrier that retains objects within the compartment or enclosure and prevent the inadvertent escape of such objects contained therein.

The following patents describe various devices or processes for holding objects upon a tray or shelf: Liss et al. U.S. Pat. No. 3,212,755; issued Oct. 19, 1965); Postula et al. (U.S. Pat. No. 3,137,249; issued Jun. 16, 1964); and Florian (U.S. Pat. No. 2,807,312; issued Sep. 24, 1957).

Liss et al. describes a magnetic guard rail suitable for medicine cabinets. The guard rail prevents accidental breakage of items stored upon a shelf of a medicine cabinet. The guard rail is designed for medicine cabinets made from steel. In essence, the guard rail is held in place through magnets. It comprises a complex array of components including plastic front posts, an integrally formed connecting rib, body members, a nonmagnetizable shelf, rear body members, cup-shaped circular shells, permanent magnets of circular shape, a steel surface, rod or railing members that extend between the posts and slidably engage with the posts through apertures and a resilient clip. The body members thus support the guard rail and are held in position on the shelf by the attractive force of the attached magnets.

Postula et al. describes a reinforced wire shelf suitable for medicine cabinets and the like. The shelf is made of a composite welded wire construction, and consists of a continuous peripheral frame, and a plurality of traversely extending rods and reinforcing rods that form two trusses to reinforce the shelf against vertical bending. The shelf is equipped with a guard assembly that reinforces the shelf to resist vertical deflection thereof. The guard includes an upper rod member having integral legs which are welded to one of the reinforcing rods, a central leg, and a longitudinal lower rod member.

Florian describes a snap-on guard for children's high chairs provided with tray portions for holding food. The guard can be attached or detached from the tray and act as a guard to retain food, dishes, toys, and the like on the tray. The guard is made from a flexible transparent sheet of thin plastic material. However, the guard must be of sufficient thickness to be self-supporting and be transparent so that it will not interfere with the vision of the child sitting in the chair. The outer marginal edge of the tray has a plurality of head-and-socket fasteners spaced regularly throughout the entire edge of the tray. The heads are screwed into the wood of the tray and the sockets are secured to the marginal edge of the base of the sheet.

The foregoing discussion should not be construed as an admission that such devices and/or patents are either relevant or material to the present invention. Rather, these patents relate generally only to the field of the invention and are discussed herein as constituting the closest art of which the inventor is aware. Moreover, these devices are generally expensive to implement and cannot easily be incorporated to existing pallet racks or else are not suitable for the task. Therefore, until now a need remained for a safer and at the same time more economical pallet rack.

SUMMARY OF THE INVENTION

An embodiment of the present invention is directed to an improved pallet rack comprising a plurality of longitudinally spaced pairs of front and rear upright posts, a plurality of laterally spaced pairs of front and rear longitudinal load beams supported by the upright posts and a plurality of longitudinally spaced lateral load beams extending between front and rear longitudinal pairs, the improvement which comprises:

a safety bracket attached at least at the rear end of the lateral load beams for preventing pallets from being pushed off the rear end of the rack, said bracket comprising:

a base member having two ends;

a back member, said back member connected at about one end of the base and extending upwardly from the base to form a stop for the pallet; and a front, substantially vertical member connected to the other end of the base and extending downwardly from the base, wherein said front member has an aperture of shape and size to allow insertion of the load beam through the aperture of the bracket and the base of the bracket to rest on the load beam of the rack with the back member extending upwardly to prevent a pallet from being pushed off of the rack.

In the preferred embodiment of the invention, the safety bracket is a single angled piece of steel having a thickness from about 0.1 to about 1 inch, preferably from about 0.2 to about 0.8 inches and most preferably from about 0.3 inches to about 0.5 inches. The safety bracket is easily and quickly attached to existing pallet racks commonly found in warehouses. Moreover, the bracket may be sized when sold to fit the exact dimensions of the pallet rack that is to be retrofitted. Safety brackets may be installed on both ends of the lateral load beams for being pushed off either end of the rack. The total number of safety brackets installed on each rack may vary depending on the exact dimensions of the rack and the pallets to be stored thereon. The main function of the safety bracket is to prevent pallets from falling off the supporting beams of the rack because of accidents occurring when the forklift is loading or unloading pallets. This safety bracket is quickly and easily attached to existing pallet racks without the use of any tools. In addition, this safety bracket does not require any permanent alteration or defacement of the pallet rack system. This ease of installation of the safety bracket, saving man-hours, together with greatly increased safety for employers, customers, merchandise and equipment, translates into significant cost savings for businesses. Notably, and in contrast to the pallet rack of the present invention, the vast majority of existing pallet racks, have nothing to stop the pallet from being pushed off the load beams onto the floor. The lateral load beams keep the pallet from falling directly below the longitudinal load support beams on which it rests due to excessive loads and/or pallet breakage but cannot prevent horizontal falls. The safety bracket of the present invention, therefore, presents a novel and cost-effective solution to this problem. When attached to the load beams of an existing prototypical pallet rack, it renders the pallet rack into a safer unit capable of preventing the pallet from being pushed off the rack, thus ensuring the safety of employees and customers in the warehouse. With this bracket in place the forklift operator has greater confidence that the pallet is safely and securely placed on the rack when the bracket engages the pallet. This also saves time in addition to adding safety.

DETAILED DESCRIPTION

Figure 1:
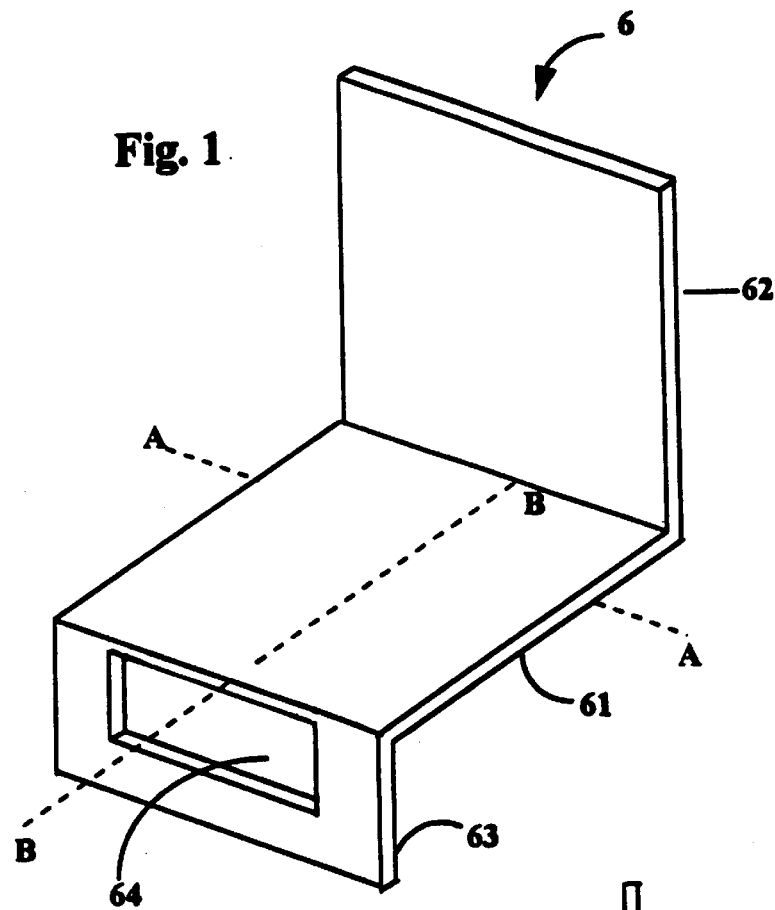
FIG. 1 is a perspective view of the preferred horizontal pallet rack safety bracket.
Figure 1A:
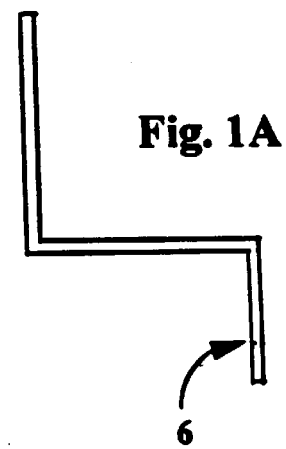
FIG. 1A is a side view of the safety bracket along line AA shown in FIG. 1.
Figure 1B:
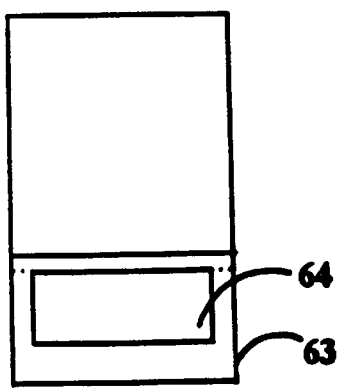
FIG. 1B is a front view of the safety bracket along line BB shown in FIG. 1.
Figure 2:
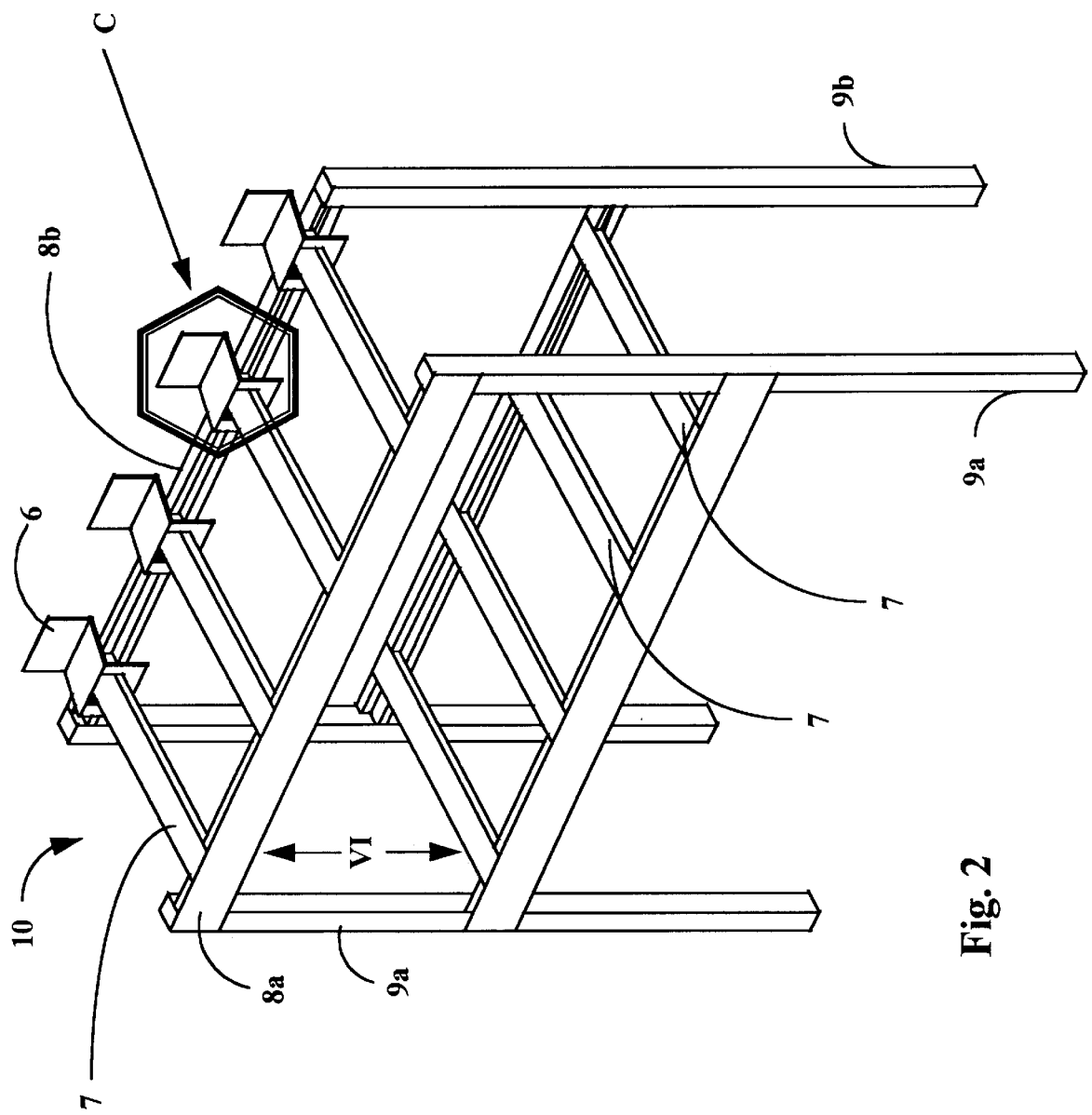
FIG. 2 is a perspective view of an embodiment of the present invention showing a pallet rack, safety bracket 6, lateral load beams 7, longitudinal load beams 8, and upright support beams 9.

FIG. 1 shows an embodiment of the invention safety bracket. This safety bracket can be easily and quickly attached to existing, typical warehouse pallet racks, to prevent a pallet from being pushed out of the rack. A prototypical pallet rack 10 is shown in FIG. 2. The pallet rack 10 comprises a plurality of longitudinally spaced pairs of front 9a and rear 9b upright support posts, a plurality of vertically spaced pairs of front and rear longitudinal load beams 8a and 8b supported on the upright support posts and a plurality of lateral load beams extending from front to rear and which are supported by the longitudinal load beams. The front longitudinal load beams 8a extend longitudinally to connect the front upright support posts 9a. Likewise, the rear longitudinal support beams 8b connect the rear upright support posts 9b. Although not shown here, various reinforcing members, for instance, lateral beams connecting the support beams, are typically provided to stabilize and reinforce the pallet rack.

The vertical interval VI between two consecutive pairs of longitudinal load beams is adapted to allow sufficient clearance for the easy loading of pallets therein. The lateral load beams 7 also known as safety steel beams extend across each pair of longitudinal load beams from front to rear, and are spaced longitudinally within the rack at fixed intervals. The pallet rack of FIG. 2 has two decks, but it is understood that a typical rack can have a plurality of decks spaced vertically. Also in an often found variation of the above pallet rack design some or all of the lateral load beams are supported by the support upright posts. Pallet racks can be easily and quickly transformed to the improved apparatus of the present invention.

Ordinarily, pallets are loaded cross-wise onto the longitudinal load beams by the use of a forklift. The forklift operator lifts the pallet and slides it on the rack so that the pallet rests on top of the load beams. The pallets frequently overhang or extend forwardly from the longitudinal load beams. The lateral load beams, known also as safety steel beams, are designed to prevent the pallet from falling through the space between the front and rear longitudinal load beams. Preferably, the improved pallet rack incorporates the safety bracket at the rear end of each lateral load beam to prevent a pallet from being pushed off the rear longitudinal load beam of the rack; however, it is plausible not to install the safety bracket at the end of each lateral load beam but to space them at intervals of about the width of a pallet to be stored on the rack. In yet another embodiment of the present invention, the safety brackets may be installed at both the front and rear ends of each lateral load beam to prevent a pallet from being pushed off either the rear or the front longitudinal load beam of the rack.

The safety bracket can be made out of a number of sturdy materials such as metal, plastic, wood or reinforced glass, preferably metal or plastic, and most preferably plastic. Examples of a plastic material that could be used are high impact polypropylene copolymer, reinforced nylon and polycarbonates. The thickness of the safety bracket will differ depending upon the type of material used. It is important that the bracket have sufficient strength to withstand the force exerted upon it in an accidental push of the pallet since the main function of the safety bracket is to prevent pallets from being pushed off the rear longitudinal beams 8b accidentally during forklift loading or unloading of the pallets.

Figure 1C:
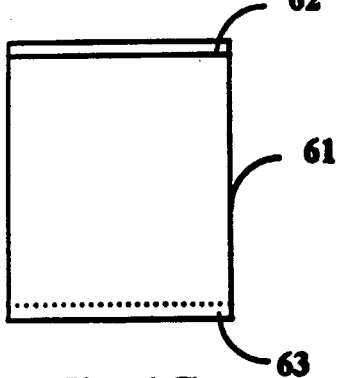
FIG. 1C is a top view of the safety bracket of FIG. 1.

In a preferred embodiment shown in FIGS. 1–1C, a safety bracket of the present invention 6 comprises a base member 61, a back member 62, and a front member 63. Those three members are integrally connected at generally right angles to form a generally Z-shaped frame. The base member is preferably a rectangular, flat piece of steel having a thickness of about 0.25 inches. Its length may range from about 0.5 inches to about 2 times the width of the longitudinal load beams of the pallet rack, preferably from about 0.8 times to about 1.5 times the width of the longitudinal load beams. The top surface is generally flat providing ample space for the pallet to rest. The bottom surface is also preferably flat, matching the surface of the load beams.

The back member 62 of the safety bracket is a rectangular piece of steel which is integrally connected to one end of the base 61 extending upwardly and substantially vertically from the base 61. The back member, as shown in FIG. 1, is of preferably the same width and thickness as the base member, and has a height ranging from about 0.5 inches to about 5 inches, preferably from about 1.0 inches to about 3 inches. The back member can be either formed from a single piece of material with the base 61 or attached to the base 61. If made of a structural plastic and as if, for example, high impact polypropylene it can be molded with at least a vertically extending pile for enhanced rigidity.

The front member 63 is integrally connected to the other end of the base member 61 and is extending downwardly from the base and in substantially vertical relationship to the base 61. The front member is preferably a rectangular piece of steel having the same width and thickness as the base and the back members. Its height may range from about 1.1 times the thickness of the load beams to about 3.0 times the thickness of the load beams, preferably from about 1.5 to about 2 times. Front member 63, when attached to the base 61, forms a rectangular aperture 64 of sufficient size and shape to receive the end portion of the load beam. The shape and size of the aperture may vary corresponding to the shape and size of the cross-section of the load beam to be inserted therein for a close fit.

It is understood, however, that the embodiment shown in FIG. 1 is only one of many contemplated as being within the scope of the present invention and which are covered by the claims. For instance, in another embodiment of the present invention, the load beams of the pallet rack may be cylindrical in which instance the bottom surface of the base of the safety bracket can be of a concave shape adapted to allow the base 61 of the bracket 6 to closely rest on top of the cylindrical beams 7. Also, the back member, the base member, and front member could be separate parts held together by a variety of well known fastener means such as bolts, rivets, clamps, and hooks. Moreover, the back member could be a structure of any shape and size connected to the top surface of the base by a variety of fastening means which extends upwardly from the base and which has sufficient height and sturdiness so as to form an effective stop for the pallets, preventing them from being pushed off the pallet rack accidentally during loading or unloading of the pallet rack. The front member 63 can generally be a member of any shape and size having an aperture 64 extending therethrough, the aperture 64 being shaped for closely receiving the end portion of the load beam 7.

Figure 3:
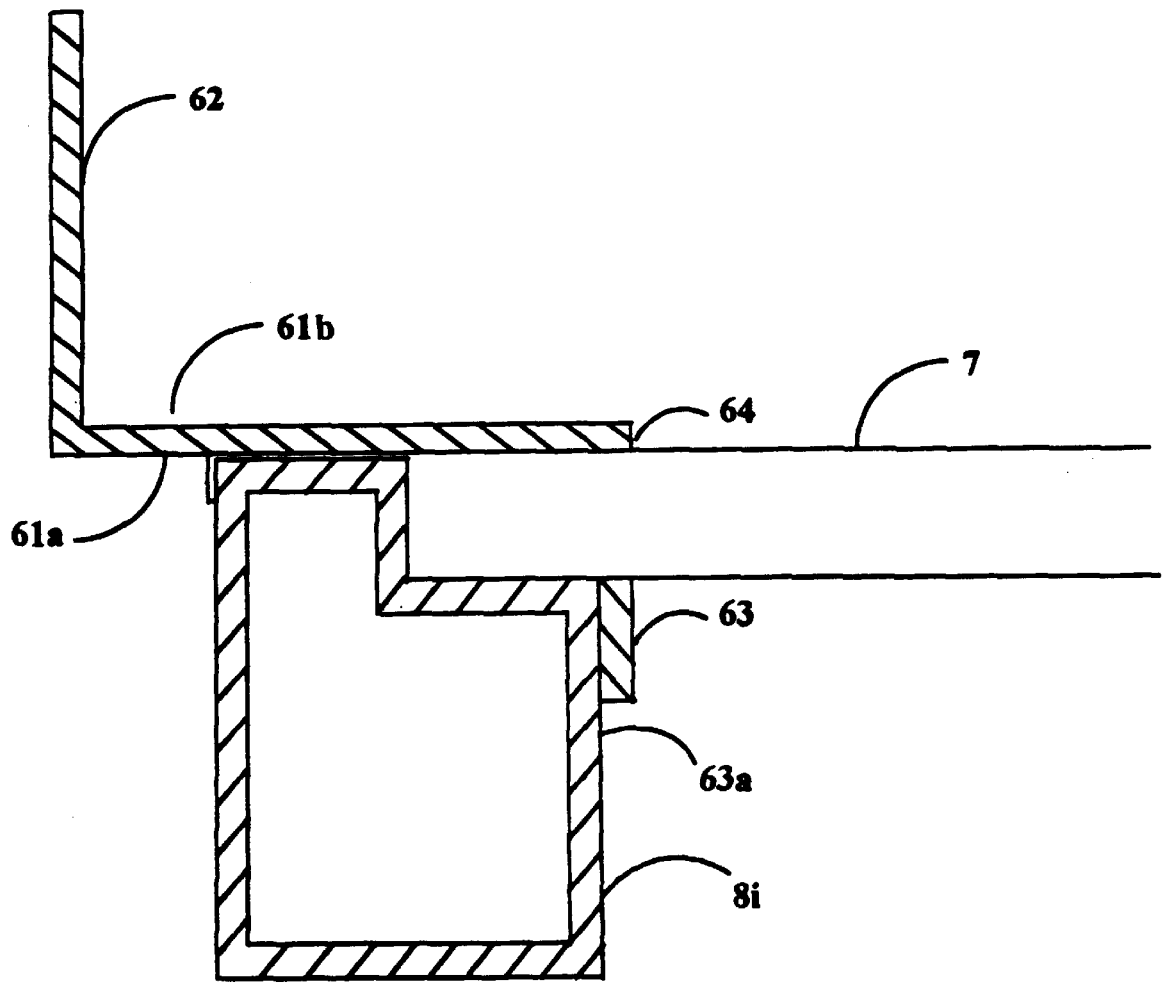
FIG. 3 is an expanded, cross-sectional view of area C of FIG. 2, showing the details of the installation of the safety bracket 6 on the pallet rack.

Referring now to FIG. 3, the safety bracket 6 is installed by slipping a lateral load beam 7 through aperture 64 of the safety bracket 6 to secure the bracket on the pallet rack at about the end of the rear load beam. The safety bracket 6 is pulled to the point where the back surface of the front member of the bracket 63a is touching against the inside surface of the longitudinal load beam 8i. When in place, at least a portion of the bottom surface 61a of the base member is resting on top of the lateral load beam 7 of the pallet rack, while the top surface 61b of the base provides ample space for the pallet to rest in the pallet racking. The back member 62 of the safety bracket 6 provides a barrier or stop that prevents the pallet from being pushed off the rear longitudinal load beam 8b of the pallet rack due to mishandling, etc.

From the foregoing description of preferred embodiments of this invention, those skilled in the art to which the invention pertains may make many obvious changes and modifications without departing from the scope of the present invention as it is defined in the following claims.

What is claimed is:

1. In a pallet rack comprising a plurality of longitudinally spaced pairs of front and rear upright posts, a plurality of laterally spaced pairs of front and rear horizontal longitudinal load beams supported by the upright posts and a plurality of longitudinally spaced horizontal lateral load beams extending between the front and rear longitudinal pairs, the improvement comprising;

a safety bracket attached at one end of the lateral load beams for preventing pallets from being pushed off that end of the rack, said bracket comprising:
      a horizontal base member having first and second ends a top surface and bottom surface;
      a back member, said back member connected at about the first end of the base member and extending upwardly from the base member to form a stop for the pallet; and
      a front, substantially vertical member connected to the second end of the base member and extending downwardly from the base member, wherein said front member has an aperture having a top edge that lies in substantially the same plane as the bottom surface of the base member and is of shape and size to conform to a shape and size defined by of the lateral load beams and whereby the bottom surface of the base member of the bracket is adapted to rest on a selected one of the horizontal load beams of the rack with the plane of the back member extending upwardly to prevent a pallet from being pushed off of the rack.

2. The pallet rack of claim 1 wherein the aperture substantially corresponds to the cross section of the lateral load beam.

3. The pallet rack of claim 2, wherein said safety bracket is a single piece.

4. The pallet rack of claim 3, wherein said safety bracket is made out of steel.

5. The pallet rack of claim 3, wherein said safety bracket is made out of plastic.

6. The pallet rack of claim 1, wherein said front and back members are substantially vertical.

7. In a pallet rack comprising a plurality of longitudinally spaced pairs of front and rear upright posts, a plurality of laterally spaced pairs of horizontal front and rear longitudinal load beams supported by the upright posts and a plurality of longitudinally spaced lateral load beams extending between the front and rear longitudinal pairs, the improvement comprising:

a safety bracket attached at one end of the lateral load beams for preventing pallets from being pushed off that end of the rack, said bracket comprising:
      a horizontal base member having first and second ends a top surface and a bottom surface;
      a back member, said back member connected at about the first end of the base member and extending upwardly from the base member to form a stop for the pallet; and
      a front, substantially vertical member connected to the second end of the base member and extending downwardly from the base member, wherein said front member has a rectangular aperture for closely receiving an end portion of the lateral load beam through the aperture of the bracket whereby the aperture has a top edge that lies in substantially the same plane as the bottom surface of the base member and the bottom surface of the base member of the bracket is adapted to rest on a selected one of the horizontal longitudinal load beams of the rack with the back member extending upwardly to prevent a pallet from being pushed off of the rack.

* * * * *